June 16, 1942.　　　R. E. MILLER　　　2,286,684
REAR END BRAKE VALVE
Filed Sept. 28, 1940　　　2 Sheets-Sheet 1
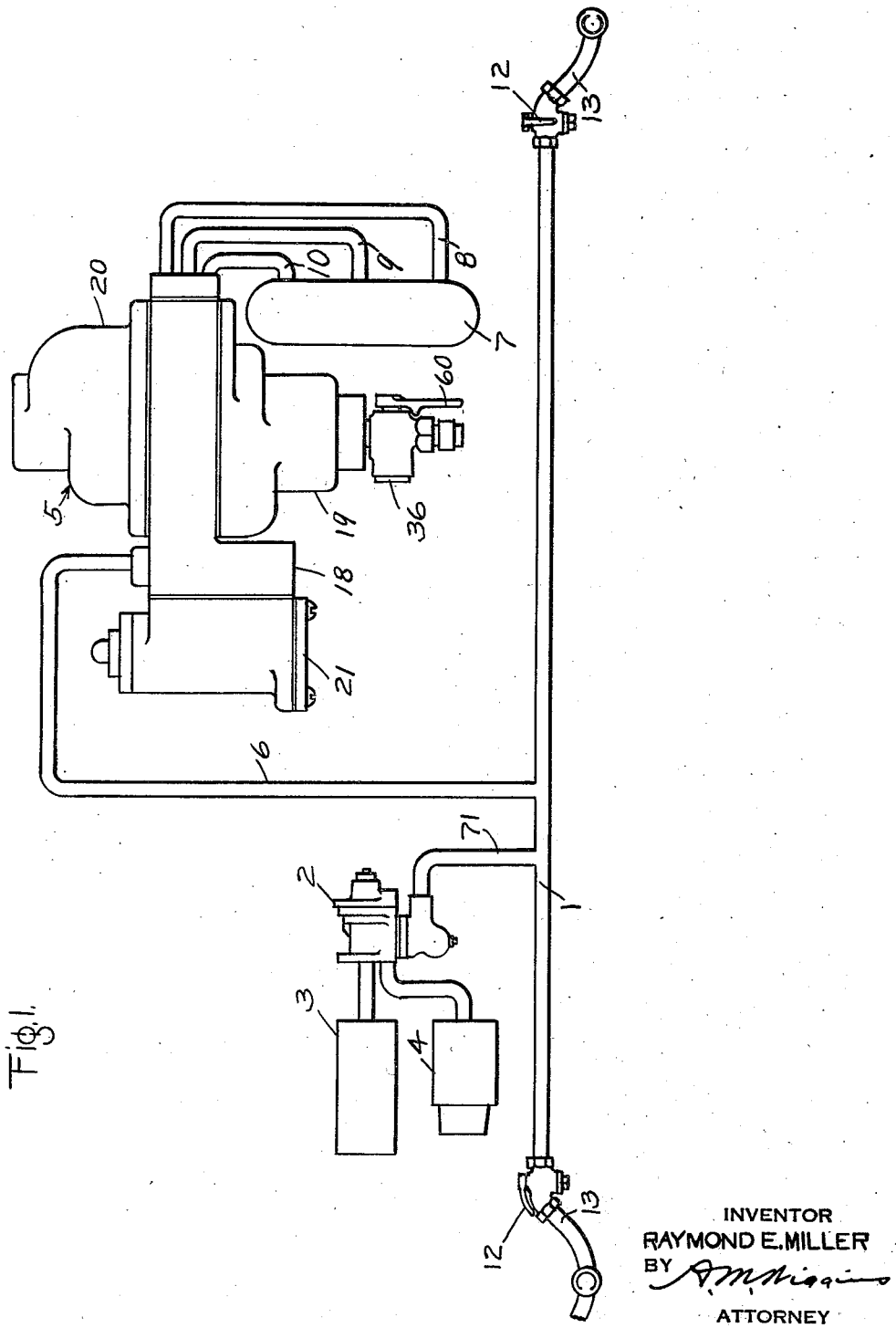
INVENTOR
RAYMOND E. MILLER
BY
ATTORNEY

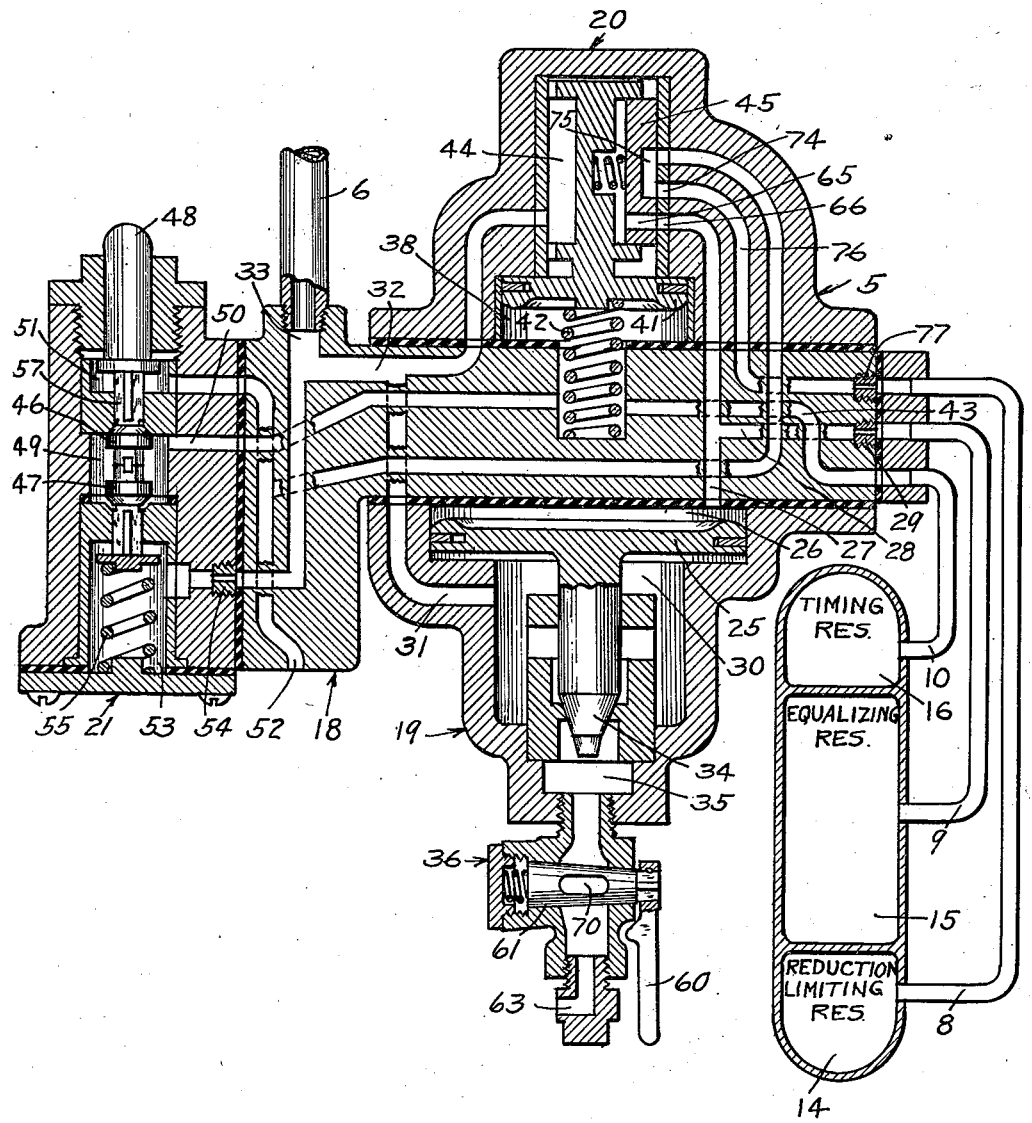

Patented June 16, 1942

2,286,684

UNITED STATES PATENT OFFICE 2,286,684

REAR END BRAKE VALVE

Raymond E. Miller, Wilkinsburg, Pa., assignor to The Westinghouse Air Brake Company, Wilmerding, Pa., a corporation of Pennsylvania Application September 28, 1940, Serial No. 358,780

15 Claims. (Cl. 303—47)

This invention relates to fluid pressure brakes, and more particularly to a rear end brake valve device or brake application valve device adapted to be mounted on a caboose or other rear car of a train, and through the medium of which a trainman may effect an application of the brakes independently of the engineman.

Caboose or cabin cars now in service are provided with one or another type of brake application valve device for effecting an application of the train brakes independently of the brake valve device or other equivalent control apparatus located on the locomotive or other leading vehicle of the train. These application valve devices are used to bring the train to a stop in case a trainman discovers a train or road bed defect that may be considered dangerous, such for instance, as a hot journal, or a dragging brake beam, etc., and are used particularly to control the train brakes when a train is backing up. Some types of these brake application valve devices are provided with a rotary valve which is formed with a plurality of ports of various areas which are adapted to be successively brought into registration with a single atmospheric vent port for effecting brake applications at either a service or an emergency rate. Such a brake application valve device, as shown, described and claimed in Patent No. 1,850,621 issued to C. C. Farmer, March 22, 1932.

In the event that a trainman discovers a train or a road bed defect which is grave enough to call for an immediate train stop, he may become excited and as a consequence may not exercise the proper judgment in operating a valve device of the type shown in the above mentioned patent to effect such an application of the brakes as to bring the train to a stop without the danger of damage to the train.

It is therefore the principal object of the invention to provide a trainman's brake application valve device which is manually set in operation to automatically effect a service application of the brakes of a predetermined degree without requiring the exercise of any skill or judgment on the part of the trainman.

Another object of the invention is to provide a brake application valve device of the above type, which is simple in construction and reliable and exact in function under all conditions of service.

In the accompanying drawings, Fig. 1 is a diagrammatic view illustrating the embodiment of the invention in a well known type of car brake equipment.

Fig. 2 is an enlarged diagrammatic sectional view of the brake application valve device and compartment reservoir arrangement shown in Fig. 1.

In Fig. 1 of the accompanying drawings the fluid pressure brake equipment of the rear car and its hose connection to the adjacent car of the train has been illustrated, a showing of the other parts of the train brake system being deemed unnecessary to a clear understanding of the invention. This equipment may comprise the usual train or brake pipe 1, triple valve 2, auxiliary reservoir 3 and brake cylinder 4, all of which parts and devices are associated with each other in the usual well known manner. This equipment may also comprise my improved brake application valve device 5, which is connected to the brake pipe 1 through a pipe 6, or any other suitable fluid pressure conduit, which valve device is also connected through pipes 8, 9 and 10, with a three compartment reservoir 7.

The fluid pressure brake equipment of all the other cars of the train may be the same as that for the rear car with the exception that the brake application valve device 5 and the three compartment reservoir 7 may be omitted.

Each end of the brake pipe 1 is provided with a manually operative angle cock 12 having the usual hose 13 connected thereto for coupling with a like hose on the adjacent end of an adjacent car. When a train is made up, the coupling hose between the adjacent ends of adjacent cars are coupled together in the usual manner, the angle cock 12 at the front and rear of the train are closed and all the other angle cocks are open so that, in effect, the brake pipe is continuous from one end of the train to the other.

As best shown in Fig. 2 of the drawings, the three compartment reservoir 7 comprises three volumes which I shall term a reduction limiting reservoir 14, an equalizing reservoir 15 and a timing reservoir 16, which three volumes are connected to the brake application valve device 5 by means of pipes 8, 9 and 10, respectively.

The brake application valve device 5 may comprise a pipe bracket portion 18, an equalizing discharge valve portion 19, a pilot valve portion 20 and a manually operative control portion 21, which portions are secured together in any suitable manner.

Pipe bracket portion 18 comprises a casing to which the brake pipe and reservoir pipes 8, 9 and 10 are connected, and is provided with the necessary ports for establishing communication between the other portions of the valve device.

The equalizing discharge valve portion 19 is provided with a casing in which there is operatively mounted an equalizing discharge valve mechanism comprising a piston 25, which has a chamber 26 at one side thereof connected to the equalizing reservoir 15, through a passage 27, a connected passage 28, a choke 29 and pipe 9. At the opposite side of the piston 25 there is a chamber 30 which is connected with a brake pipe 1, through passages 31, 32 and 33 and brake pipe branch pipe 6.

The piston 25 is adapted to operate a discharge valve 34, contained in chamber 30, for controlling the venting of fluid from the chamber 30 and connected brake pipe 1, to a discharge chamber 35 which is adapted to be cut into or out of communication with an atmospheric passage. As shown in the drawings and as hereinafter described, the atmospheric communication for the discharge chamber 35 is controlled by a manually operative charging cock 36, which may be of the usual well known construction, and which may have screw-threaded connection with the casing of the equalizing portion 19.

The pilot valve portion 20 may comprise a casing having formed therein a piston chamber 38 which is connected through a passage 43 and pipe 10 to the timing reservoir 16 and which contains a piston 41 having a stem for actuating a slide valve 45 contained in a chamber 44 which is connected to the brake pipe 1 by way of passages 32 and 33 and branch pipe 6. Contained in chamber 38 and interposed between and operatively engaging the casing and the face of the piston 41 is a spring 42 which at all times acts to bias the piston in a direction toward its normal position, in which position the piston is shown in Fig. 2.

The manually operative controlled portion 21 may comprise a casing containing a pair of oppositely seating valves 46 and 47 of the poppet type and a manually operative plunger 48 for effecting operation of these valves.

Valves 46 and 47 are contained in a chamber 49 which is constantly open to the timing reservoir 16 through a passage 50, piston chamber 38 in the pilot valve portion 20, passage 43 and pipe 10. The valve 46 is adapted to seat on a valve seat, formed on a bushing rigidly secured to the casing, to control communication between the valve chamber 49 and a chamber 51 constantly piston 41 is a spring 42 which at all times acts open to the atmosphere through an exhaust port 52 in the pipe bracket portion 18.

The valve 47 is adapted to seat on a valve seat, formed on a bushing rigidly secured to the casing, to control communication between the valve chamber 49 and a chamber 53, which is constantly connected to the brake pipe 1, through a choke 54, passage 33, and brake pipe branch pipe 6. A coil spring 55 disposed in chamber 53 and interposed between the bottom wall of the casing and a fluted stem of the valve 47, tends at all times, to urge the valve 47 in a direction away from its seat. The valve 46 is provided with a fluted stem 57 which is operatively engaged, within the chamber 51, by the inner end of the plunger 48, the outer end of the plunger projecting beyond the exterior of the casing for manual operation.

*Operation*

Assuming that a caboose or cabin car, equipped with the brake equipment embodying the invention and the equipment being devoid of fluid under pressure, is to be coupled to a train of cars in which the brake equipments are charged with fluid under pressure, the plug valve 61 of the charging cock 36 is turned, through the medium of the handle 60, to the position in which it is shown in Fig. 1. In this position the valve cuts off communication between discharge chamber 35 and an exhaust port 63 which is constantly open to the atmosphere.

When the brake pipe hose between the adjacent ends of the caboose and the rear car of the train have been coupled together, the angle cock at the rear end of the caboose will be closed and the angle cock on the front end of the caboose and the adjacent angle cock on the rear end of the last car of the train will be open. When these two latter angle cocks are open, fluid under pressure flows from the charged brake pipe of the train through hose 13, the open angle cock 12 of the caboose to the caboose brake pipe 1 which now constitutes a part of the train brake pipe. From the brake pipe 1 fluid under pressure flows through branch pipe 6 to passage 33 in the brake pipe bracket portion 18 of the brake application valve device 5, from whence it flows to the timing reservoir 16, through choke 54 and chamber 53 in the manually operative control portion 21, past unseated valve 47, chamber 49, passage 50, piston chamber 38 of the pilot valve portion 20, passage 43 and pipe 10 to charge the piston chamber 38 and the timing reservoir 16 to the pressure of fluid carried in the brake pipe 1.

Fluid under pressure supplied to passage 33 also flows to the valve chamber 44 of the pilot valve portion 20 by way of passage 32. With the slide valve 45 in the position shown, as is the case under the above conditions, fluid under pressure applied to the chamber 44 flows through a port 65 in the slide valve, a port 66 in the slide valve seat and passage 27 to the equalizing piston chamber 26. Fluid under pressure also flows from passage 27 to the equalizing reservoir 15 through connected passage 28, choke 29 and pipe 9. Fluid under pressure supplied to passage 32, also flows to chamber 30 in the equalizing discharge valve portion 19 by way of connected passage 31.

When the fluid pressure brake equipment on the caboose has been charged with fluid to the pressure normally carried in the train equipment, the handle 60 and thereby the plug valve 61 of the charging cock 36 are moved to a position in which a water-way 70 in the plug valve establishes communication between discharge chamber 35 and exhaust port 63, the remaining parts of the brake application valve device remaining in the position shown in Fig. 2 of the drawings.

Fluid under pressure supplied to brake pipe 1 also flows through a brake pipe branch pipe 71 to the triple valve device 2 to effect charging of the auxiliary reservoir 3 and to maintain fluid under pressure vented from the brake cylinder 4 in the usual well known manner.

Now when it is desired to operate the application valve device 5 to effect an application of the brakes, the operator depresses the plunger 48 causing the valve 47 to be seated and the valve 46 to be unseated. With the valve 47 seated communication between chambers 49 and 53 is cut off, and with the valve 46 unseated communication between chambers 49 and 51 is established. Under these conditions fluid under pressure in the timing reservoir 16 is quickly vented to the atmosphere by way of pipe 10, passage 43, piston chamber 38 in the pilot valve portion 20, passage 50, chamber 49, past unseated valve 46, chamber 51 and passage 52. It will be the duty of the operator to maintain the plunger 48 depressed a short interval of time, i. e. until the flow of fluid from the exhaust port 52 ceases which is easily determined by the cessation of the noise due to the escape of fluid to the atmosphere. When the flow of fluid has ceased, the operator relieves the pressure on the plunger.

It will here be noted that the only manual requirement is that the operator depress the plunger and maintain said plunger depressed a short interval of time, i. e. until the timing reservoir has been quickly and substantially completely vented of fluid under pressure.

When the timing reservoir pressure in piston chamber 38 has been reduced to a degree where brake pipe pressure acting in valve chamber 44 is sufficient to overcome the opposing force of spring 42 on piston 41, the piston and connected slide valve move to their lower position. With the slide valve 45 in this position the port 65 in the valve is disconnected from the port 66 in the seat and a port 74 in the seat is connected to port 66 by means of a cavity 75 in the slide valve. With this communication established, fluid under pressure in the equalizing reservoir 15 and connected chamber 26 of the equalizing discharge valve portion 19 flows to the reduction limiting reservoir 14, by way of pipe 9, choke 29, passages 28 and 27, port 66, cavity 75, port 74, a passage 76, a choke 77, and pipe 8.

The reduction in equalizing reservoir pressure and connected chamber 26 at the upper side of the equalizing discharge piston 25 will permit the higher brake pipe pressure acting on the opposite side of the piston to move it upwardly thereby unseating vent valve 34, so that fluid under pressure in chamber 30 and connected brake pipe 1 will be vented to the atmosphere past unseated valve 34, through chamber 35, water-way 70 of the plug valve 61 and exhaust port 63, thereby effecting a reduction in brake pipe pressure which causes the triple valve device 2 to operate in the usual well known manner to effect an application of the brakes.

This reduction in brake pipe pressure will continue until the pressure of fluid in the brake pipe falls below the value of the fluid under pressure in the equalizing reservoir and connected chamber 26 acting on the opposite side of the piston. When this occurs the pressure in chamber 26 will cause the piston to move to the position in which it is shown in the drawings, in which position the vent valve 34 is seated, thus cutting off communication between chambers 30 and 35. This results in cutting off the flow of fluid under pressure from the brake pipe to the atmosphere and thus limiting the reduction in brake pipe pressure to the desired degree.

The equalizing and reduction limiting reservoir volumes and the choke 77 are so proportioned that the equalizing reservoir pressure will be reduced to the proper degree and at the proper rate to effect the desired service application of the brakes.

When the plunger is relieved of manual pressure the valve 46 will be moved to its seated position and the valve 47 to its unseated position by the action of the spring 55. When this occurs communication between chambers 49 and 51 is cut off and communication is established between chambers 49 and 53 so that fluid under pressure will again flow from the brake pipe 1 to the piston chamber 38 and timing reservoir 16, the choke 54 controlling the rate of such flow. This flow of fluid from the brake pipe is by way of choke 54 which so controls the rate of flow that the increase in the pressure of fluid in the chamber and reservoir to a value sufficient to permit the spring 42 to move the piston 41 and thereby the slide valve 45 to their inner positions will be delayed for a period of time of such duration as to insure the continued flow of fluid from the brake pipe until the desired reduction in brake pipe pressure is obtained.

When the pressure of fluid in chamber 38 has been increased to substantially the pressure of fluid in valve chamber 44, the spring 42 forces the piston 41 and attached slide valve 45 to their upper position, as shown in Fig. 2 of the drawings, at which time the desired reduction in brake pipe pressure will have been completed.

With the slide valve 45 in this position the port 66 in the seat is disconnected from the port 74 in the seat and a port 80 in the seat is connected to port 74 by means of the cavity 75 in the slide valve. With this latter connection established, fluid under pressure in the reduction limiting reservoir 14 flows to the atmosphere by way of pipe 8, through choke 77, passage 76, port 74, cavity 75, port 80, a passage 81 and the exhaust passage 52. Further, with the slide valve in this position port 65 in the valve registers with port 66 in the seat and as a consequence fluid at brake pipe pressure in chamber 44 flows to the equalizing piston chamber 26 by way of port 65, port 66 and passage 27. At the same time fluid supplied to passage 27 flows to the equalizing reservoir 15 by way of passage 28 through choke 29 and pipe 9, so as to recharge the chamber 26 and reservoir 15 for the next rear end initiated brake application.

The flow area of the choke 29 may be made such that when the slide valve 45 is moved to its upper position, the flow of fluid under pressure to the equalizing reservoir will not materially retard the rate of buildup in the pressure of fluid in chamber 26. This will insure against any unwanted raising of the vent valve 34 from its seat in recharging the equipment.

Upon a subsequent release of the brakes initiated at the front end of the train, the pressure of fluid in brake pipe 1 will be increased and the triple valve device 2 will operate in the usual well known manner to effect a release of the brakes.

It will here be noted that the volume of slide valve chamber 44 of the pilot valve portion 20 and the chambers 26 and 30 of the equalizing discharge valve portion 19, and the flow area of the associated passages leading from passage 33 in the pipe bracket portion 18, are such that they are charged at approximately the same rate as chamber 38 of the pilot valve port 20, so that spring 42 maintains piston 41 and attached slide valve 44 in the position shown in the drawings during the time the equipment is being recharged to the pressure carried in the brake pipe 1.

From the foregoing description it will be seen that the valve device 5, when set in operation by manually depressing the plunger 48, will operate automatically to control the rate and degree of brake pipe reduction, so as to apply the brakes without danger of damage to the train.

While one embodiment of the brake application valve device provided by my invention has been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. Means operative at the rear end of a train for venting fluid under pressure from the brake pipe of a train fluid pressure brake system, which system is of the type having brake controlling valve devices operative upon a service rate of reduction in brake pipe pressure to effect a service application of the brakes, said means comprising valve means for venting fluid from the brake pipe to effect a service rate of brake pipe reduction, means for limiting the reduction in brake pipe pressure, and means including a plunger having a normal position and a depressed position and operative when held in said depressed position for an interval of time to automatically effect operation of the first and second mentioned means.

2. Means operative at the rear end of a train for venting fluid under pressure from the brake pipe of a train fluid pressure brake system, which system is of the type having brake controlling valve devices operative upon a service rate of reduction in brake pipe pressure to effect a service application of the brakes, a reservoir normally charged with fluid under pressure from the brake pipe, said means comprising valve means operative to vent fluid from the reservoir, other valve means for venting fluid from the brake pipe to effect a service rate of reduction in brake pipe pressure, said other valve means being rendered operative upon a predetermined reduction in the pressure of fluid in said reservoir, and manually controlling means for effecting operation of the first mentioned valve means.

3. In a train fluid pressure brake system the combination with a brake pipe and brake controlling valve device operative upon a reduction in brake pipe pressure to effect an application of the brakes, a brake application valve device operative at the rear end of said system for venting fluid under pressure from the brake pipe, of a first and a second reservoir normally charged with fluid under pressure, a third reservoir normally vented to the atmosphere, said application valve device comprising valve means subject to the opposing pressures of fluid in the brake pipe and fluid in said first reservoir and operative upon a reduction in the pressure of fluid in said first reservoir for venting fluid from the brake pipe, a pilot valve including means subject to the opposing pressure of fluid in the brake pipe and fluid in the second reservoir and operative to establish communication from the first to the third reservoir for limiting the reduction in pressure in the first reservoir upon venting of fluid from said second reservoir, and manually operative means for controlling the supply of fluid to and the release of fluid from said second reservoir.

4. In a train fluid pressure brake system the combination with a brake pipe and brake controlling valve device operative upon a reduction in brake pipe pressure to effect an application of the brakes, of a brake application valve device operative at the rear of said system for venting fluid under pressure from the brake pipe, a first reservoir, and a second reservoir, said application valve device comprising an equalizing reservoir discharge valve operative upon a reduction in the pressure of fluid in said first reservoir for venting fluid from the brake pipe, a communication through which fluid may flow from the brake pipe to said first reservoir, another communication through which fluid in said second reservoir may flow to the atmosphere, a passage through which fluid may flow from the first reservoir to the second reservoir for effecting a certain reduction in the pressure of fluid in said first reservoir, valve means having one position for opening both of said communications and for closing said passage and having another position for closing both of said communications and for opening said passage, and manually operative means having a normal position for effecting operation of said valve means to said one position and a depressed position for effecting operation of said valve means to said other position.

5. In a train fluid pressure brake system the combination with a brake pipe and brake controlling valve device operative upon a reduction in brake pipe pressure to effect an application of the brakes, a brake application valve device operative at the rear end of said system for venting fluid under pressure from the brake pipe, of an equalizing reservoir, said application valve device comprising an equalizing discharge valve mechanism subject to the opposing pressures of fluid in the brake pipe and that in the equalizing reservoir and operative upon a reduction of pressure in the equalizing reservoir to vent fluid under pressure from the brake pipe, and operative upon an increase in equalizing reservoir pressure to cut off venting of fluid from the brake pipe, means for controlling the rate and for also controlling the degree of said reduction, valve means having one position for supplying fluid to and being movable to another position for releasing fluid from said reservoir, resilient means for normally maintaining the valve means in said one position, and manually operative means having a normal position for rendering said resilient means effective to maintain said valve means in said one position and another position for rendering said resilient means ineffective to maintain said valve means in said one position against movement to said other position.

6. In a fluid pressure brake system the combination with a brake pipe and brake controlling valve device operative upon one degree of brake pipe reduction to effect an application of the brakes to a certain degree, of a brake application valve device operative by a push button at the rear of said system for automatically effecting a reduction in brake pipe pressure to said one degree, said application valve device comprising an equalizing discharge valve mechanism automatically operative to effect a reduction in brake pipe pressure to said one degree, a chamber normally charged with fluid under pressure, valve means subject to the opposing pressure of fluid in said chamber and in said brake pipe and operative upon venting of fluid under pressure from said chamber for effecting operation of said mechanism, and a push button operative when depressed to vent fluid from said chamber.

7. In a fluid pressure brake system the combination with a brake pipe and brake controlling valve device operative upon one degree of brake pipe reduction to effect an application of the brakes to a certain degree, of a brake application valve device operative by a push button at the rear of said system for automatically effecting a reduction in brake pipe pressure to said one degree, said application valve device comprising an equalizing discharge valve mechanism automatically operative to effect a reduction in brake pipe pressure to said one degree, a pilot valve comprising a chamber adapted to be charged with fluid under pressure, valve means subject to the opposing pressures of fluid in said chamber and fluid in the brake pipe and operative upon venting of fluid from said chamber for effecting operation of said mechanism, valve means having one position for supplying fluid under pressure to said chamber and another position for venting fluid from said chamber, spring means for normally maintaining said valve means in said one position, a push button operative when depressed for actuating said valve means to said other position.

8. In a fluid pressure brake system, the combination with a brake pipe, of means on the rear vehicle of a train for effecting a certain reduction in brake pipe pressure comprising an equalizing discharge valve mechanism for automatically effecting said reduction, a pilot valve for effecting operation of said mechanism, and manually operative valve means for controlling said pilot valve, said valve means comprising a pair of oppositely seating valves, spring means for effecting operation of said valves to one position and a plunger operative to effect operation of said valves to another position, said valves being operative upon movement to said other position for controlling said pilot valve to effect operation of said mechanism.

9. In a fluid pressure brake system, the combination with a brake pipe, of means on the rear vehicle of a train for effecting a certain reduction in brake pipe pressure, comprising a timing reservoir and an equalizing reservoir normally charged with fluid under pressure, a reduction limiting reservoir normally vented to the atmosphere, and a brake application valve device, said valve device comprising means subject to the opposing pressures of fluid in the brake pipe and that in the equalizing reservoir and operative upon a reduction in equalizing reservoir pressure for venting fluid from the brake pipe, pilot valve means subject to the opposing pressures of fluid in the brake pipe and that in the timing reservoir and operative upon venting of fluid from the timing reservoir for venting fluid from the equalizing reservoir to the reduction limiting reservoir and for cutting off the venting of fluid from said limiting reservoir to the atmosphere to limit the degree of reduction in equalizing reservoir pressure, means for controlling the rate of venting from said equalizing reservoir to said limiting reservoir, and control means operative when actuated for venting fluid from the timing reservoir.

10. In a fluid pressure brake system, the combination with a brake pipe, of means on the rear vehicle of a train for effecting a certain reduction in brake pipe pressure, comprising a timing reservoir and an equalizing reservoir normally charged with fluid under pressure from the brake pipe, means for controlling the charging rate of said timing reservoir, other means for controlling the charging rate of the equalizing reservoir, and a brake application valve device, said valve device comprising an equalizing discharge valve mechanism operative upon a certain reduction in equalizing reservoir pressure for effecting a certain reduction in brake pipe pressure, valve means for initiating the reduction in equalizing reservoir pressure, a choke for controlling the rate of said reduction, means for controlling the degree of said reduction, and control means operative to vent fluid from the timing reservoir for effecting operation of said valve means.

11. In a fluid pressure brake system the combination with a brake pipe and brake controlling valve devices operative upon a reduction in brake pipe pressure to effect an application of the brakes, of means operative at the rear end of said system for venting fluid under pressure from the brake pipe, said means comprising an equalizing reservoir normally charged with fluid under pressure, a discharge chamber normally connected to the atmosphere, through which brake pipe pressure is vented, another chamber normally charged with fluid from the brake pipe, a valve having one position for opening a communication between the said other chamber and the discharge chamber, a movable abutment subject to the opposing pressures of fluid in the brake pipe and that in the equalizing reservoir and operative upon a reduction in equalizing reservoir pressure for actuating said valve to said one position, means including a plunger having a normal position and a depressed position and operative in said depressed position for effecting a definite reduction in said equalizing reservoir pressure, and manually operative means disposed in said discharge chamber for controlling communication from said discharge chamber to the atmosphere.

12. In a fluid pressure brake system, the combination with a brake pipe normally charged with fluid under pressure, of means on the rear vehicle of a train for effecting a certain reduction in brake pipe pressure, comprising an equalizing reservoir and a pressure chamber normally charged with fluid under pressure from the brake pipe, a brake application valve device comprising means subject to the opposing pressures of fluid in the brake pipe and that in the equalizing reservoir and operative upon a reduction of pressure in said reservoir to vent fluid under pressure from the brake pipe, valve means subject to the opposing pressure of fluid in the brake pipe and that in said pressure chamber and operative upon a reduction of pressure in said pressure chamber to effect a reduction in the pressure of fluid in said equalizing reservoir and operative upon an increase in pressure chamber pressure to increase the pressure of fluid in the equalizing reservoir, control means operative to one position to effect a reduction in the pressure of fluid in said pressure chamber and operative to another position to supply fluid under pressure to said pressure chamber, and flow restricting means controlling the rate of flow of fluid under pressure from the brake pipe to said pressure chamber to insure against the premature operation of said valve means to increase the pressure of fluid in the equalizing reservoir.

13. In a train fluid pressure brake system, the combination with a brake pipe; a brake controlling valve device operative upon a reduction in brake pipe pressure to effect an application of the brakes; a normally charged equalizing reservoir; and a brake application valve device operative at the rear end of said system for venting fluid under pressure from the brake pipe, said application valve device comprising a valve subject to the opposing pressures of fluid in the brake pipe and that in the equalizing reservoir and operative upon a reduction of pressure in said reservoir to vent fluid under pressure from the brake pipe, a normally charged timing reservoir, valve means subject to the opposing pressure of fluid in the brake pipe and that in said timing reservoir and operative upon a reduction of pressure in said timing reservoir to effect a reduction in the pressure of fluid in said equalizing reservoir and operative upon an increase in timing reservoir pressure to increase the pressure of fluid in the equalizing reservoir, a valve device operative to one position to effect a reduction in the pressure of fluid in said timing reservoir and operative to another position to supply fluid under pressure to said timing reservoir, and means for restricting the rate of flow of fluid to said timing reservoir to insure against the premature operation of said valve means to increase the pressure of fluid in the equalizing reservoir.

14. In a train fluid pressure brake system, the combination with a brake pipe; a brake controlling valve device operative upon a reduction in brake pipe pressure to effect an application of the brakes; a normally charged equalizing reservoir; and a brake application valve device operative at the rear end of said system for venting fluid under pressure from the brake pipe, said application valve device comprising an equalizing discharge valve mechanism operative upon a reduction in the pressure of fluid in said equalizing reservoir to vent fluid under pressure from the brake pipe, a timing reservoir normally charged with fluid under pressure from the brake pipe, pilot valve means subject to the opposing pressures of fluid in the brake pipe and that in the timing reservoir and operative upon a reduction of pressure in the timing reservoir to effect a reduction in the pressure of fluid in said equalizing reservoir and operative upon an increase in timing reservoir pressure to increase the pressure of fluid in the equalizing reservoir, control means operative to one position to effect a reduction in the pressure of fluid in said timing reservoir and operative to another position to supply fluid under pressure to said timing reservoir, and a choke for restricting the rate of flow of fluid to said timing reservoir to delay for a period of time operation of said pilot valve means to increase the pressure of fluid in the equalizing reservoir.

15. In a train fluid pressure brake system the combination with a brake pipe; a brake controlling valve device operative upon a reduction in brake pipe pressure to effect an application of the brakes; a normally charged equalizing reservoir; and a brake application valve device operative at the rear end of said system for venting fluid under pressure from the brake pipe, said application valve device comprising an equalizing discharge valve mechanism automatically operative upon a reduction in the pressure of fluid in said equalizing reservoir to vent fluid under pressure from the brake pipe, a pilot valve comprising a chamber adapted to be charged with fluid under pressure, valve means subject to the opposing pressures of fluid in said chamber and fluid in the brake pipe and operative upon a reduction of pressure in said chamber to effect a reduction in the pressure of fluid in said equalizing reservoir and operative upon an increase in the pressure of fluid in said chamber to increase the pressure of fluid in the equalizing reservoir, valve means having one position for supplying fluid under pressure to said chamber and another position for venting fluid from said chamber, and means for restricting the rate of flow of fluid to said chamber to insure against the premature operation of said pilot valve to increase the pressure of fluid in the equalizing reservoir, said means including a choke disposed in the fluid pressure supply line to said chamber and a reservoir connected to said chamber to increase the volume of the chamber.

RAYMOND E. MILLER.